(12) United States Patent
Dole et al.

(10) Patent No.: US 7,988,207 B2
(45) Date of Patent: Aug. 2, 2011

(54) COUPLINGS HAVING STIFFENING RIBS AND KEYS WITH OPPOSITELY DISPOSED CAMMING SURFACES

(75) Inventors: Douglas R. Dole, Whitehouse Station, NJ (US); Vance W. Henry, Easton, PA (US)

(73) Assignee: Victaulic Company, Easton, PA (US)

( * ) Notice: Subject to any disclaimer, the term of this patent is extended or adjusted under 35 U.S.C. 154(b) by 124 days.

(21) Appl. No.: 12/370,063

(22) Filed: Feb. 12, 2009

(65) Prior Publication Data

US 2009/0200799 A1 Aug. 13, 2009

Related U.S. Application Data

(60) Provisional application No. 61/027,868, filed on Feb. 12, 2008.

(51) Int. Cl.
*F16L 17/00* (2006.01)
(52) U.S. Cl. .......................... 285/367; 285/112
(58) Field of Classification Search .......... 285/112, 285/364–367, 421, 407, 411
See application file for complete search history.

(56) References Cited

U.S. PATENT DOCUMENTS

| 2,028,182 | A | * | 1/1936 | Barnickol, Jr. | ................. 285/112 |
| 2,428,189 | A | * | 9/1947 | Wolfram | |
| 2,464,416 | A | * | 3/1949 | Raybould | |
| 3,054,629 | A | | 9/1962 | Piatek | |
| 3,351,352 | A | | 11/1967 | Blakely et al. | |
| 3,695,638 | A | | 10/1972 | Blakeley | |
| 3,851,903 | A | * | 12/1974 | Nienhaus et al. | ............. 285/421 |
| 3,977,705 | A | | 8/1976 | Thiessen et al. | |
| 4,289,335 | A | * | 9/1981 | Olbermann | ................... 285/364 |
| 5,058,931 | A | | 10/1991 | Bowsher | |
| 5,603,508 | A | | 2/1997 | Dole | |
| 6,227,577 | B1 | | 5/2001 | Ikeda et al. | |
| 6,375,228 | B1 | | 4/2002 | Klemm | |
| 7,086,131 | B2 | | 8/2006 | Gibb et al. | |
| 2003/0020276 | A1 | | 1/2003 | Steele | |
| 2005/0212284 | A1 | | 9/2005 | Dole et al. | |
| 2005/0242585 | A1 | | 11/2005 | Dole et al. | |

OTHER PUBLICATIONS

Young, Lee W.; PCT Notification of Transmittal of the International Search Report and the Written Opinion of the International Searching Authority, or the Declaration from corresponding International Patent Application No. PCT/US2010/037181; United States Patent and Trademark Office as International Searching Authority; Aug. 17, 2010; 1 page.

Young, Lee W.; PCT International Search Report from corresponding International Patent Application No. PCT/US2010/037181; United States Patent and Trademark Office as International Searching Authority; Aug. 17, 2010; pp. 1-2.

Young, Lee W.; PCT Written Opinion of the International Searching Authority from corresponding International Patent Application No. PCT/US2010/037181; United States Patent and Trademark Office as International Searching Authority; Aug. 17, 2010; pp. 1-4.

(Continued)

*Primary Examiner* — Aaron Dunwoody
(74) *Attorney, Agent, or Firm* — Ballard Spahr LLP

(57) ABSTRACT

Mechanical pipe couplings for joining pipe elements in end to end relation have arcuate keys which engage circumferential grooves in the pipe elements and radially projecting stiffening ribs aligned with the keys. At the end of the keys on opposite sides are camming surfaces which are formed by a thinning of the key. The camming surfaces may be concave, convex, or angularly oriented surfaces and serve to guide the keys into grooves when the keys are not directly aligned with the grooves.

20 Claims, 6 Drawing Sheets

OTHER PUBLICATIONS

Kuwahara, Yoshiki; PCT Notification Concerning Transmittal of International Preliminary Report on Patentability (Chapter 1 of the Patent Cooperation Treaty) from corresponding International Patent Application No. PCT/US2010/037181; United States Patent and Trademark Office as International Searching Authority, Aug. 26, 2010; 1 page.

Dunwoody, Aaron M.; Non-Final Office Action from related U.S. Appl. No. 11/091,216; United States Patent and Trademark Office; Sep. 26, 2006; pp. 1-14.

Dunwoody, Aaron M.; Final Office Action from related U.S. Appl. No. 11/091,216; United States Patent and Trademark Office; Aug. 15, 2008; pp. 1-6.

Hewitt, James M.; Non-Final Office Action from related U.S. Appl. No. 11/091,147; United States Patent and Trademark Office; Jun. 19, 2007; pp. 1-8.

Hewitt, James M.; Final Office Action from related U.S. Appl. No. 11/091,147; United States Patent and Trademark Office; Mar. 17, 2008; pp. 1-6.

Dunwoody, Aaron M.; Non-Final Office Action from related U.S. Appl. No. 11/091,146; United States Patent and Trademark Office; Sep. 22, 2006; pp. 1-14.

Dunwoody, Aaron M.; Final Office Action from related U.S. Appl. No. 11/091,146; United States Patent and Trademark Office; Mar. 7, 2007; pp. 1-12.

Dunwoody, Aaron M.; Non-Final Office Action from related U.S. Appl. No. 11/091,146; United States Patent and Trademark Office; Oct. 18, 2007; pp. 1-9.

Dunwoody, Aaron M.; Final Office Action from related U.S. Appl. No. 11/091,146; United States Patent and Trademark Office; Apr. 10, 2008; pp. 1-10.

* cited by examiner

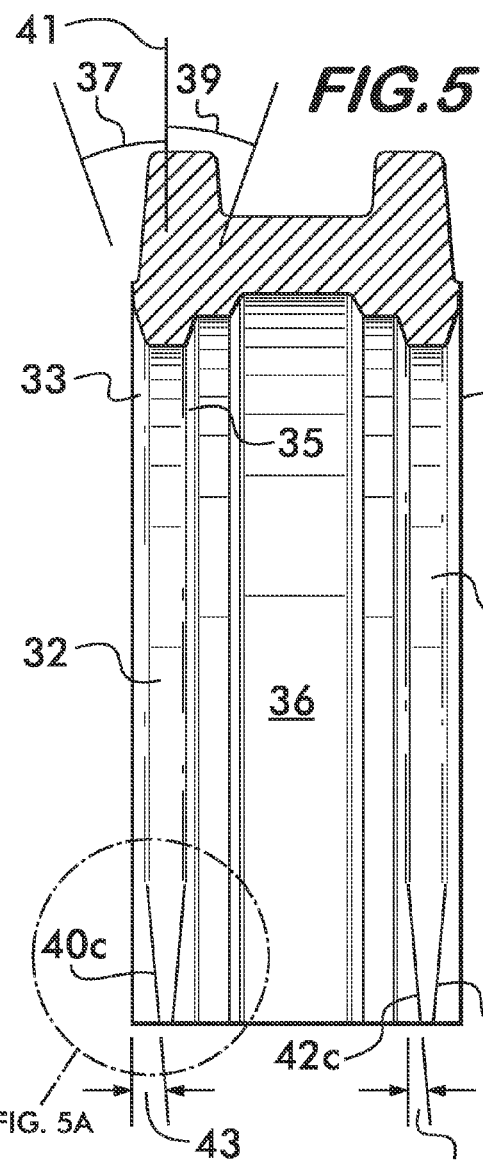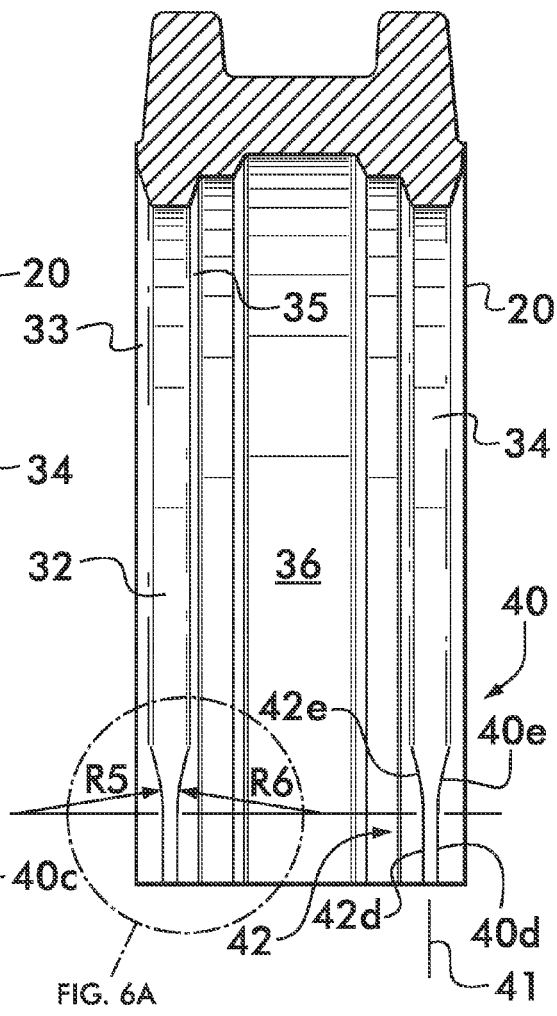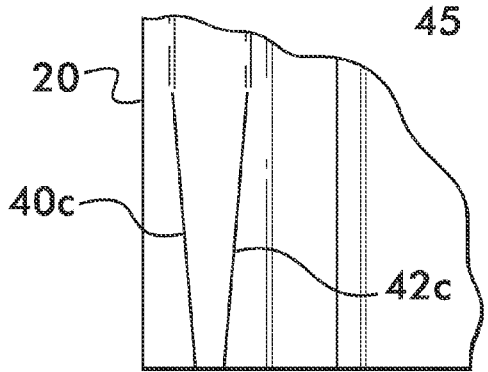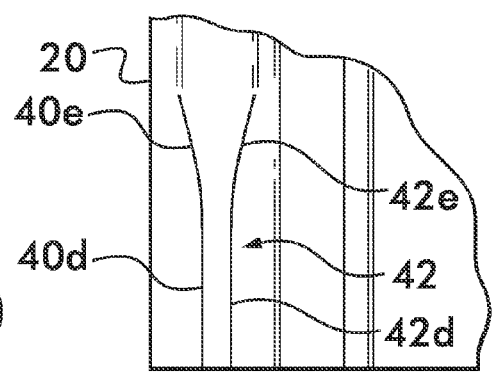

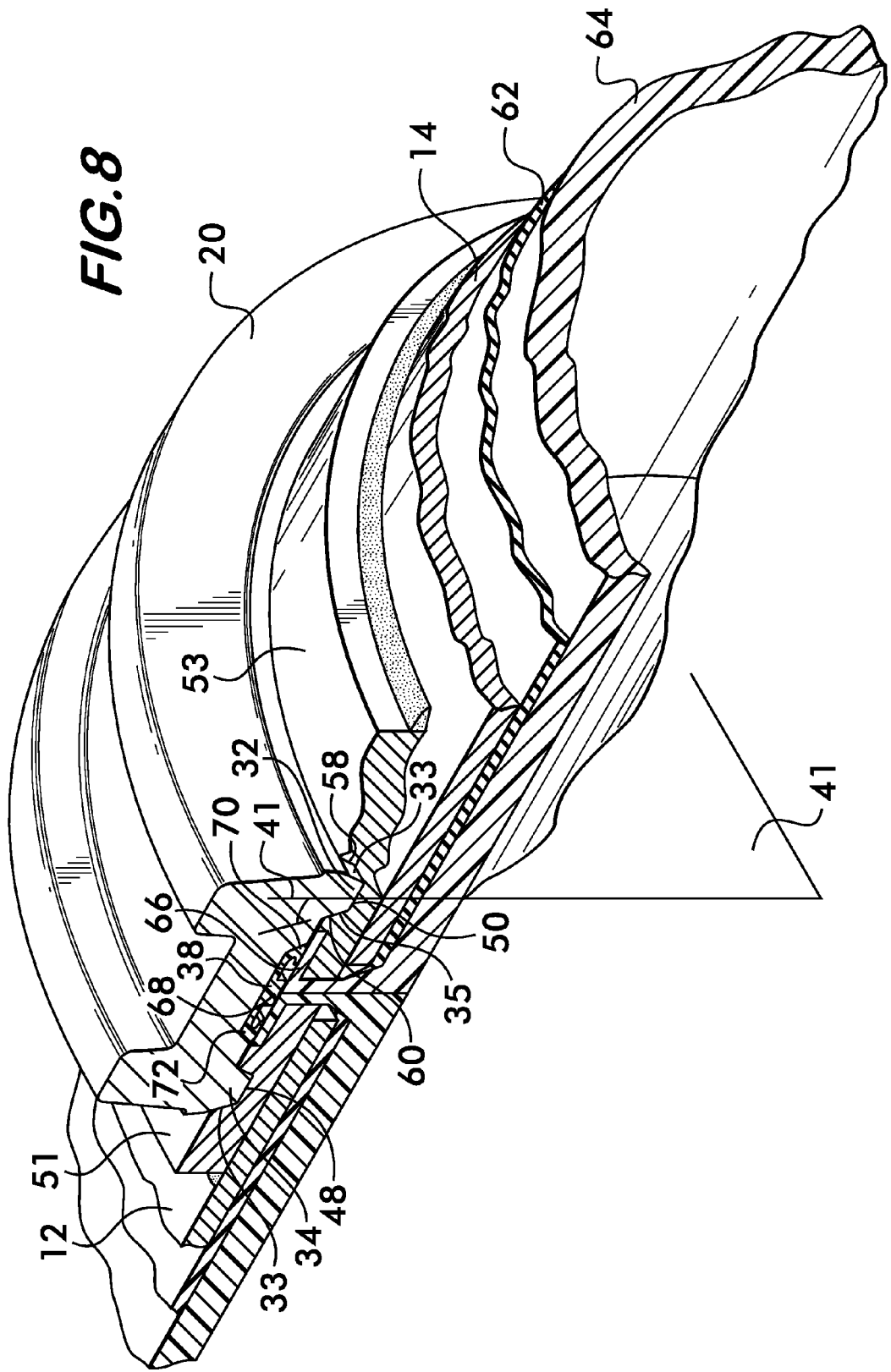

COUPLINGS HAVING STIFFENING RIBS AND KEYS WITH OPPOSITELY DISPOSED CAMMING SURFACES

CROSS REFERENCE TO RELATED APPLICATIONS

This application is based on and claims priority to U.S. Provisional Application No. 61/027,868 filed Feb. 12, 2008.

FIELD OF THE INVENTION

The invention concerns mechanical couplings for joining pipe elements in end-to-end relation and especially couplings for large diameter pipe elements.

BACKGROUND OF THE INVENTION

Large diameter pipes which carry viscous, abrasive slurries such as tar sands, exploited for oil extraction and recovery, must endure a harsh working environment. As noted, the tar sands are abrasive and are pumped through the pipes at pressures up to 600 psi and temperatures in excess of 90° C. The pipes are outfitted with insulating and abrasive resistant liners to mitigate pipe corrosion and inhibit heat transfer from the slurry to the ambient which would otherwise render the tar sands too viscous to pump effectively. The pipes must permit large mass flow rates and must withstand the aforementioned high temperatures and pressures. Consequently, the pipes are preferably formed of steel and have large diameters, thick side walls and tend to be heavy. Diameters up to 30 inches are not unusual, as well as weights on the order of 160 lbs/foot of pipe stock.

Even with the abrasion resistant liners the pipes tend to wear, and the wear is uneven, with the lowermost third of the pipe inside surface wearing most rapidly. This is due to the fact that the particles in the slurry settle to the bottom of the flow stream due to gravity and they tend to more rapidly abrade the surface over which they pass. The pipe segments must be replaced when worn out, or, to extend their life, the pipes segments are disconnected, rotated about their long axis to position a relatively un-abraded surface on the bottom, and then reconnected. Either way significant maintenance is required.

During assembly or servicing of a pipe line, segments of several pipes are joined together and then lifted and maneuvered into position with a crane for connection to the pipe line. Due to the high weight of the pipe segments significant bending stresses are imposed on the joints, which must be strong enough to maintain joint integrity.

To obtain the required strength and rigidity at pipe joints, such pipes have, in the past, been joined by welding. However, this is an expensive process which requires skilled labor and time consuming welding procedures. It is considered advantageous to use mechanical couplings instead of welded joints. Mechanical couplings simplify the procedure and do not require the time or the skills needed to form a welded joint. They facilitate rapid assembly and disassembly for servicing to replace or reposition worn pipes.

The preferred mechanical couplings may be formed of segments having keys which engage circumferential grooves near the ends of the pipes. The couplings have an internal gasket or seal and are bolted around the pipe ends in end-to-end relation, the keys being forcibly engaged with the grooves to effect a rigid joint, the seal operating to ensure fluid-tight integrity.

Like the pipes, the couplings must be structurally strong and rigid to join the heavy pipes and seal them effectively against the high pressures. The couplings are also designed to take the bending stresses imposed when a sub-assembly of multiple pipe segments is lifted and maneuvered into position in a pipe line. The couplings, therefore, tend to be massive. The weight and size of the pipes and their couplings make them awkward to handle when joining the pipes in end-to-end relation using the couplings. Due to the weight and awkwardness, it is physically difficult, even using lifting machinery such as hydraulic cranes and the like, to position pipe elements in proper end-to-end spacing and engage the keys with the grooves. There is clearly a need for mechanical couplings which, despite their size and weight, may be applied to the pipe elements so that their keys readily engage the grooves in the pipe ends and which have the required stiffness and strength to effect a rigid, fluid-tight joint.

SUMMARY OF THE INVENTION

The invention concerns a coupling for connecting two pipe elements together end-to-end. Each of the pipe elements has a circumferential groove proximate to an end thereof. The coupling comprises a plurality of segments positionable end-to-end circumferentially around the pipe elements. Each of the segments has a pair of keys projecting radially inwardly toward the pipe elements and a pair of stiffening ribs projecting radially outwardly. Each of the keys is engageable with the circumferential groove of one of the pipe elements. The keys are positioned in spaced apart relation from one another and define a space therebetween. Each of the ribs are also positioned in spaced apart relation and each rib may be aligned with a respective key. At least one of the keys on one of the segments has first and second camming surfaces oppositely disposed and positioned adjacent to one end of the segment. The first camming surface faces away from the space between the keys, the second camming surface faces toward the space between the keys. The camming surfaces are engageable with one of the grooves to guide the one key into the groove when the segments are forcibly engaged circumferentially around the pipe elements.

The keys have a wedge-shaped cross-section defined by a pair of oppositely disposed key surfaces. The key surfaces are angularly oriented with respect to a plane passing through the segments. The key surfaces have an orientation angle between about 10° and about 30° relatively to the plane. An orientation angle of about 20° relatively to the plane is advantageous.

In one embodiment of the coupling, the first and second camming surfaces are angularly oriented with respect to the key surfaces of the one key. The first and second camming surfaces have an orientation angle between about 2° and about 8° relatively to the key surfaces of the one key.

In another embodiment the first and second camming surfaces comprise curved surfaces positioned on the one key. The first and second camming surfaces have a concave curvature or a convex curvature. In another embodiment he first and second camming surfaces each comprise a first surface portion offset from the key surface on the one key, and a second surface portion having a concave curvature. Alternately, the first and second camming surfaces each comprise a first surface portion offset from the key surface on the one key and a second surface portion angularly oriented with respect to the first surface portion.

BRIEF DESCRIPTION OF THE DRAWINGS

FIG. 5 is a partial sectional view illustrating an embodiment of a coupling segment according to the invention;

FIG. 5A is a view taken from circle 5A in FIG. 5 showing a portion of the coupling segment on an enlarged scale;

FIG. 6 is a partial sectional view illustrating an embodiment of a coupling segment according to the invention;

FIG. 6A is a view taken from circle 6A in FIG. 6 showing a portion of the coupling segment on an enlarged scale;

FIG. 8 is a partial sectional isometric view of the coupling and pipe elements shown in FIG. 1.

DETAILED DESCRIPTION OF THE EMBODIMENTS

Figure 1:
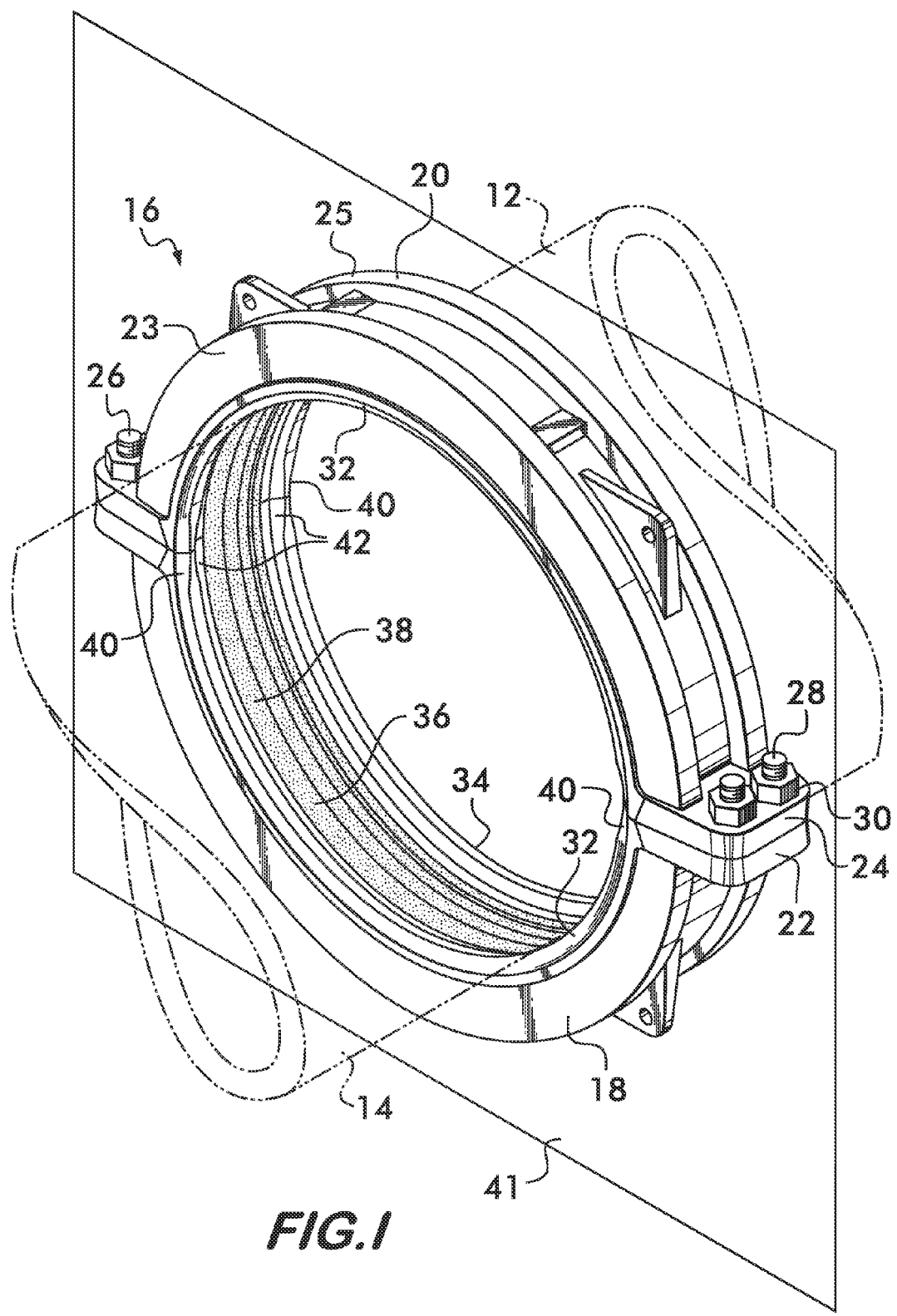
FIG. 1 is an isometric view of a coupling according to the invention connecting pipe elements in end to end relation.

FIG. 1 shows a pair of pipe elements 12 and 14 (shown in phantom line) joined in end-to-end relation using a mechanical coupling 16 according to the invention. Coupling 16 is formed of a plurality of segments, in this example, two segments 18 and 20. The segments are joined end-to-end by bolt pads 22 and 24 positioned at each end of each segment. The bolt pads are joined by fasteners 26, in this example, bolts 28 and nuts 30. Together, the bolt pads 22 and 24 and fasteners 26 comprise a means for attaching the segments end-to-end.

Figure 3:
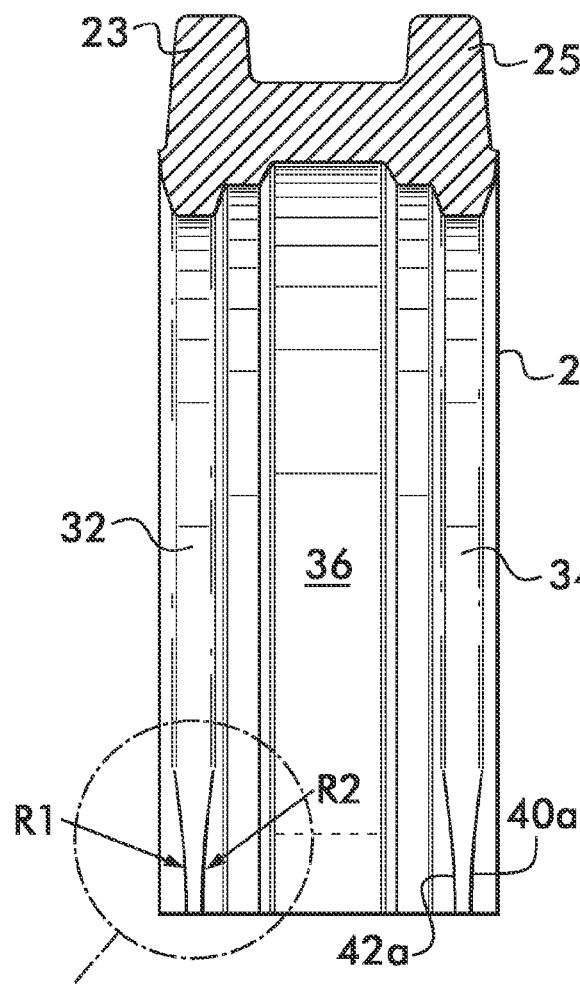
FIG. 3 is a partial sectional view illustrating an embodiment of a coupling segment according to the invention.
Figure 4:
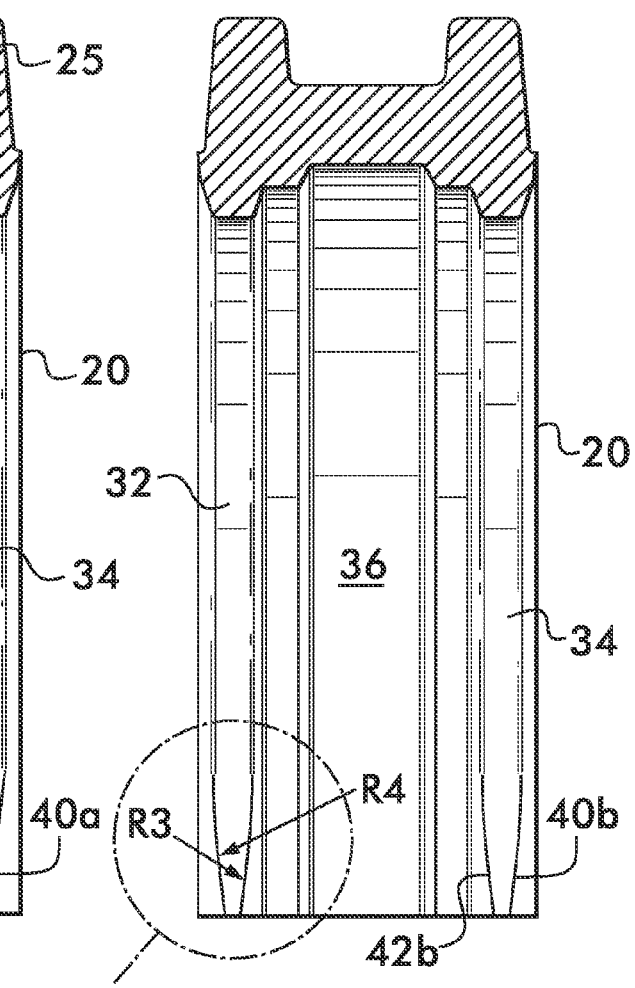
FIG. 4 is a partial sectional view illustrating an embodiment of a coupling segment according to the invention.

Each segment 18 and 20 has a pair of keys 32 and 34 and a pair of stiffening ribs 23 and 25. The keys 32 and 34 extend circumferentially around the segments and project radially inwardly toward the pipe elements 12 and 14. The ribs extend circumferentially around the segments and project radially outwardly away from the pipe elements. The keys 32 and 34 are in spaced apart relation and define a space 36 which receives a seal 38. The ribs 23 and 25 are also in spaced apart relation, and as best shown in FIG. 3, each rib is aligned with a respective key. It is advantageous to align the ribs with the keys to effectively strengthen and stiffen the segments 18 and 20 close to where the loads are applied by the pipes to the coupling thereby maintaining maximum key engagement with the groove.

As shown in FIG. 1 each of the keys has a pair of oppositely disposed camming surfaces 40 and 42 positioned at each end of the segments. The camming surfaces extend circumferentially over a portion of the keys. The portion occupied by a single camming surface may include between 5% and 10% of the total arc length of its key. As shown in detail in FIG. 2, one of the camming surfaces (40) faces outwardly away from the space 36 and the other surface 42 faces inwardly toward the space.

Figure 3A:
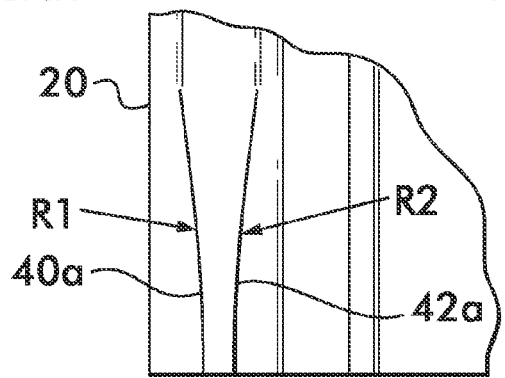
FIG. 3A is a view taken from circle 3A in FIG. 3 showing a portion of the coupling segment on an enlarged scale.
Figure 4A:
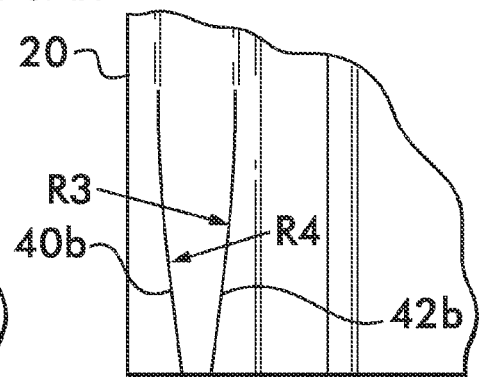
FIG. 4A is a view taken from circle 4A in FIG. 4 showing a portion of the coupling segment on an enlarged scale.

Each camming surface is defined by a thinning of the key on which it is positioned. The thinning may be effected in various ways as depicted in FIGS. 3-7. As shown in FIGS. 3 and 3A, the camming surfaces are created on opposite sides of the keys 32 and 34 by curved surfaces 40a and 42a having radii R1 and R2, which may or may not be the same. Surfaces 40a and 42a are concave relative to the surfaces of the keys 32 and 34. In an alternate embodiment, shown in FIGS. 4 and 4A, camming surfaces 40b and 42b are convexly curved surfaces having respective radii R3 and R4, which, again, may or may not be the same.

FIGS. 5 and 5A illustrate another embodiment of the invention wherein each of the keys 32 and 34 are formed of a pair of oppositely disposed key surfaces 33 and 35. Key surfaces 33 and 35 are angularly oriented at respective orientation angles 37 and 39 relative to an imaginary reference plane 41 which passes through the segments 18 and 20 (see also FIG. 1). Orientation angles 37 and 39 may range between about 10° and about 30°, with an orientation angle of about 20° being advantageous. The camming surfaces 40c and 42c are substantially flat surfaces which are angularly oriented with respect to the key surface on which they are positioned. The camming surfaces 40c and 42c have orientation angles 43 and 45 between about 2° and about 8° relatively to the respective key surfaces 33 and 35 on which each camming surface is positioned (see also FIG. 2).

In another embodiment, shown in FIGS. 6 and 6A, each camming surface 40 and 42 is formed of two surface portions. Camming surface 40 is formed of a flat surface portion 40d and a concavely curved surface portion 40e. Similarly, camming surface 42 is formed of a flat surface portion 42d and a concavely curved surface portion 42e. The flat surface portions 40d and 42d are substantially parallel to the reference plane 41 and offset from the key surfaces 33 and 35. The curved surface portions 40e and 42e have respective radii R5 and R6. The curved surface portions 40e and 42e provide a smooth transition between the flat surface portions 40d and 42d and the surfaces 33 and 35 of the keys 32 and 34.

Figure 7:
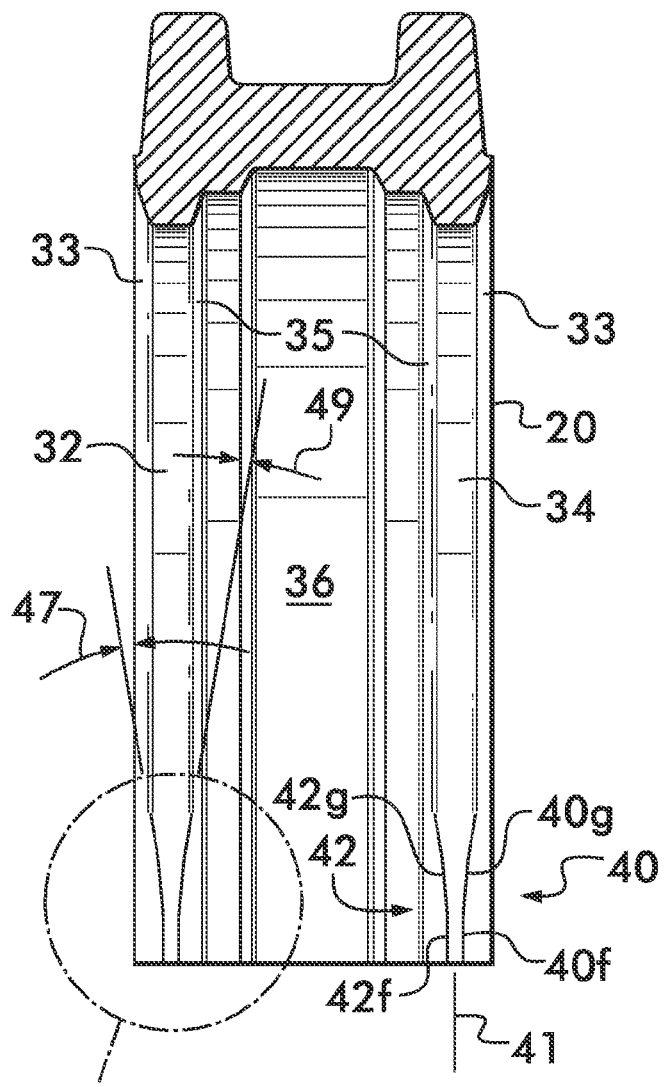
FIG. 7 is a partial sectional view illustrating an embodiment of a coupling segment according to the invention.
Figure 7A:
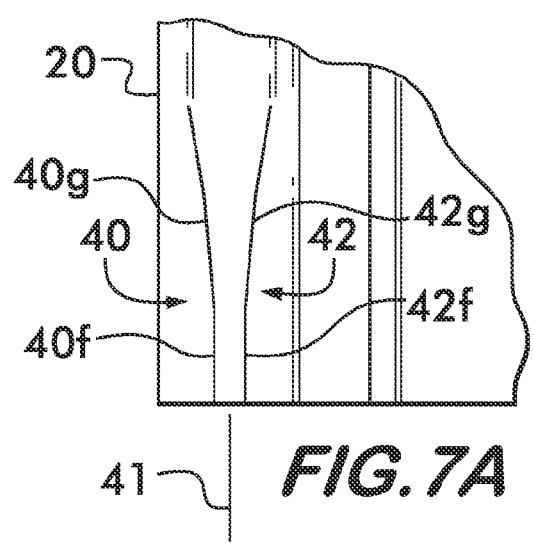
FIG. 7A is a view taken from circle 7A in FIG. 7 showing a portion of the coupling segment on an enlarged scale.

In FIG. 7, each camming surface 40 and 42 is formed of two surface portions. Camming surface 40 is formed from a flat surface portion 40f and an angularly oriented surface portion 40g. Similarly, camming surface 42 is formed from a flat surface portion 42f and an angularly oriented surface portion 42g. The flat surface portions 40f and 42f are substantially parallel to the reference plane 41 and offset from the key surfaces 33 and 35. The angularly oriented surface portions 40g and 42g have orientation angles 47 and 49 measured relatively to the surfaces 33 and 35 of the keys 32 and 34. Orientation angles between about 2° to about 15° are feasible. The angularly oriented surface portions 40g and 42g provide a smooth transition between the flat, offset surface portions 40f and 42f and the surfaces of the keys 32 and 34.

One camming surface on a particular key need not be the same length, have the same offset, orientation angle or have the same curvature as its opposite camming surface on the same key. Additionally, the camming surfaces at opposite ends of a segment need not be the same as one another.

Figure 2:
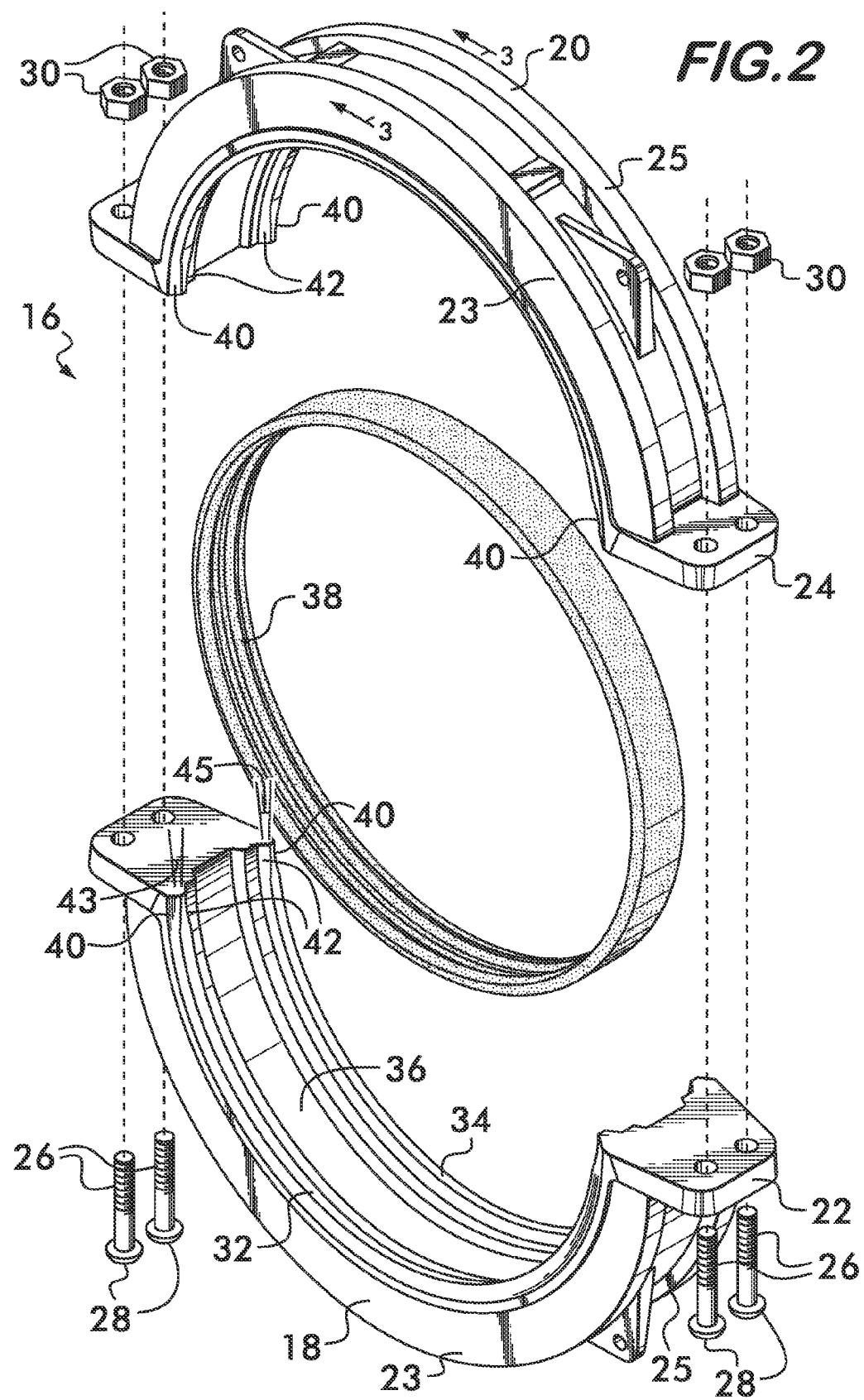
FIG. 2 is an exploded isometric view of the coupling shown in FIG. 1.

FIG. 2 shows an exploded view of the coupling 16, with the seal 38 shown as an elastomeric ring received within space 36 between the keys 32 and 34 of each segment 18 and 20. Seal 38 effects a fluid-tight joint between the pipe elements 12 and 14 as best shown in FIG. 8. Segments 18 (not shown) and 20 are positioned circumferentially around the pipe elements 12 and 14. The pipe elements 12 and 14 have respective reinforcing rings 51 and 53. The rings may surround the pipe ends as shown, or be butt welded to the ends, and serve to add strength to the joint against stresses imposed by bending, pressure and compression due to thermal expansion. Circumferential grooves 48 and 50 are positioned in rings 51 and 53, the grooves being engaged by the keys 32 and 34 of the segments. It is advantageous to position the grooves in the rings rather than in the pipe segments to avoid thinning and thereby weakening the pipe wall. Preferably, the keys have a wedge-shaped cross-section and the grooves have a complementary shape to the keys. Engagement of the keys within the grooves prevents thrust loads from separating the pipe elements when they are under pressure. Preferably, the keys and grooves are sized so that the keys fill the grooves when the bolt pads 22 and 24 at each end of the segments are in pad to pad engagement as shown in FIG. 1. By designing the coupling for pad-to-pad engagement, the joint is easy to inspect visually for compliance with the relevant specifications and the need to specify bolt torques is eliminated, As noted above, the key surfaces 33 and 35 of the keys 32 and 34 are oriented at an angle between about 10° and about 30° to the plane 41, with an orientation angle of about 20° being advantageous. The side surfaces 58 and 60 of the grooves 48 and 50 are matched to these angles. Preferably, the angle is about 20°. This range of angles for the side surfaces of the keys and the grooves is found effective at preventing ejection of the pipe elements from the coupling under the pressures experienced during operation. The angular range of the key surfaces is also advantageous for maintaining the joints in the face of compression loads caused when the pipes heat up and expand between anchor points.

Because the pipe elements carry a hot, abrasive, viscous slurry under high pressure, a slurry which must remain hot so that it does not become too viscous to pump, the pipe elements are lined with an insulating layer 62 and an abrasion resistant layer 64 as shown in FIG. 8. The insulating layer 62 is preferably a rubber compound such as butyl which reduces heat loss through the pipe side wall to the ambient. The insulating layer is attached directly to the inside surface of the pipe and is protected from the abrasive slurry by a tough urethane which comprises the abrasion resistant layer 64. Preferably, the abrasion resistant layer 64 extends from the inside surface of pipe elements 12 and 14 to the butt ends of the pipe elements and the outside surface to form an outwardly facing end layer 66 at the ends of each pipe. This end layer 66 helps prevent slurry from reaching the seal 38 and thereby prevents corrosion and deterioration to increase the seal life. The couplings 18 and 20 must have adequate strength to absorb compressive stress and limit the deflection of the pipes under the forces imposed by thermal expansion to prevent the abrasion resistant layer on the butt ends of the pipes from being crushed. Otherwise as the pipes cooled and contracted the seal 38 would be exposed to the slurry. The angular orientation of the key surfaces 33 and 35 helps maintain the joint against compression forces due to thermal expansion.

Seal 38 has a circumferential center body 68 which is located at the interface between the end layers 66 of the pipe elements 12 and 14. Two circumferential lobes 70 and 72 are positioned on opposite sides of the center body. When the segments 18 and 20 are bolted together, they compress the seal 38, which in turn, exerts pressure on the pipe ends beneath the lobes and the center body, thereby effecting a fluid-tight seal at the pipe and seal interface.

An advantage is secured by having oppositely disposed camming surfaces 40 and 42 at the ends of keys 32 and 34. Namely, the camming surfaces serve as guides which allow the pipe ends a relatively wide latitude of misalignment and separation at the start of assembly but still enable the segments 18 and 20 to be readily engaged with the pipe ends. Separation distances of up to ⅜ inches between the pipe ends are tolerable, the camming surfaces acting as guides to catch the grooves as they are brought into engagement and force the pipe elements to assume their desired relative position by forcible interaction between the camming surfaces and the grooves. Similarly, angular misalignments between the pipe elements up to 0.7° may also be tolerated upon assembly and still lead to a coupling of the pipe ends without the need to readjust the relative positions of the pipe elements, the interaction between the pipe elements and the camming surfaces aligning the pipe elements axially, angularly and laterally as required for a rigid, fluid-tight joint. Of special concern is the alignment of the inner surfaces of the linings wherein it is advantageous that there be no gap between pipe ends, no significant angular displacement or lateral offset. A smooth, continuous inner surface is desired to mitigate liner corrosion. The ability to handle significant pipe separation and misalignment is especially advantageous when heavy components, such as the pipe elements and couplings described above, must be positioned to construct a piping network.

What is claimed is:

1. A coupling for connecting two pipe elements together end-to-end, each of said pipe elements having a circumferential groove proximate to an end thereof, said coupling comprising:

a plurality of segments positionable end-to-end circumferentially around said pipe elements, each of said segments having a pair of keys projecting radially inwardly toward said pipe elements and a pair of stiffening ribs projecting radially outwardly away therefrom, said ribs being positioned in spaced apart relation to one another, each said key for engagement with said circumferential groove of one of said pipe elements, said keys being positioned in spaced apart relation from one another and defining a space therebetween, at least one of said keys on one of said segments having first and second camming surfaces oppositely disposed and positioned adjacent to one end of said segment, said first camming surface facing away from said space between said keys, said second camming surface facing toward said space between said keys, said first and second camming surfaces each comprising a first surface portion oriented parallel to a single plane passing through said segments and offset from said key surface on said one key, and a second surface portion oriented transversely to said plane, said camming surfaces being engageable with one said grooves to guide said one key into said groove when said segments are forcibly engaged circumferentially around said pipe elements.

2. The coupling according to claim 1, wherein each of said ribs is substantially aligned with one of said keys.

3. The coupling according to claim 1, wherein said keys have a wedge-shaped cross-section defined by a pair of oppositely disposed key surfaces, said key surfaces being angularly oriented with respect to said plane passing through said segments.

4. The coupling according to claim 3, wherein said key surfaces each have an orientation angle between about 10° and about 30° relatively to said plane.

5. The coupling according to claim 3, wherein said key surfaces each have an orientation angle of about 20° relatively to said plane.

6. The coupling according to claim 1, wherein said second surface portion is angularly oriented with respect to said first surface portion.

7. The coupling according to claim 6, wherein said second surface portion is angularly oriented with respect to said key surfaces of said at least one key.

8. The coupling according to claim 7, wherein said second surface portion has an orientation angle between about 2° and about 8° relatively to said key surfaces of said one key.

9. The coupling according to claim 1, wherein said second surface portion has a concave curvature.

10. A coupling for connecting two pipe elements together end-to-end, each of said pipe elements having a circumferential groove proximate to an end thereof, said coupling comprising:

a pair of segments positionable end-to-end circumferentially around said pipe elements, each of said segments having a pair of keys projecting radially inwardly toward said pipe elements and a pair of stiffening ribs projecting radially outwardly away therefrom, said ribs being positioned in spaced apart relation to one another, each said key for engagement with said circumferential groove of one of said pipe elements, said pair of keys on each said segment being positioned in spaced apart relation from one another and defining a space therebetween, each of said keys on each of said segments having first camming surfaces positioned at opposite ends of said keys and facing away from said space between said keys, each of said keys on each of said segments having second camming surfaces positioned at opposite ends of said keys and facing toward said space between said keys, said first camming surface comprising a first surface portion being substantially flat and parallel to a single plane passing through said segments, said first surface portion being offset from said key surface facing away from said space between said keys;

a second surface portion oriented transversely to said plane, said second surface portion being positioned between said first surface portion and said key surface facing away from said space; and wherein said second camming surfaces comprises:

a first surface portion being substantially flat and parallel to said plane, said first surface portion of said second camming surface being offset from said key surface facing toward said space between said keys; and a second surface portion being oriented transversely to said plane, said second surface portion of said second camming surface being positioned between said first surface portion of said second camming surface and said key surface facing toward said space, said camming surfaces being engageable with one of said grooves to guide said keys into said grooves when said segments are forcibly engaged circumferentially around said pipe elements.

11. The coupling according to claim 10, wherein each of said ribs is substantially aligned with one of said keys.

12. The coupling according to claim 10, wherein each of said keys has a wedge-shaped cross-section defined by a pair of oppositely disposed key surfaces, said key surfaces being angularly oriented with respect to a plane passing through said segments, one of said key surfaces facing away from said space between said keys, the other of said key surfaces facing toward said space between said keys.

13. The coupling according to claim 12, wherein said key surfaces each have an orientation angle between about 10° and about 30° relatively to said plane.

14. The coupling according to claim 12, wherein said key surfaces each have an orientation angle of about 20° relatively to said plane.

15. The coupling according to claim 12, wherein said second surface portion of said first camming surface has an orientation angle between about 2° and about 8° relatively to said key surface facing away from said space between said keys and said second surface portion of said second camming surface has an orientation angle between about 2° and about 8° relatively to said key surface facing toward said space between said keys.

16. The coupling according to claim 10, wherein said second camming surface comprises a curved surface.

17. The coupling according to claim 16, wherein said second camming surface has a concave curvature.

18. The coupling according to claim 16, wherein said second camming surface has a convex curvature.

19. The coupling according to claim 10, wherein said
second surface portion has a concave curvature; and wherein said second surface portion having a concave curvature.

20. The coupling according to claim 10, wherein said
second surface portion has an angular orientation; and wherein said second surface portion has an angular orientation.

* * * * *